H. J. LONG.
THERMOSTATIC SNAP CONTROL.
APPLICATION FILED SEPT. 14, 1914.
1,231,527.
Patented June 26, 1917.
2 SHEETS—SHEET 2.
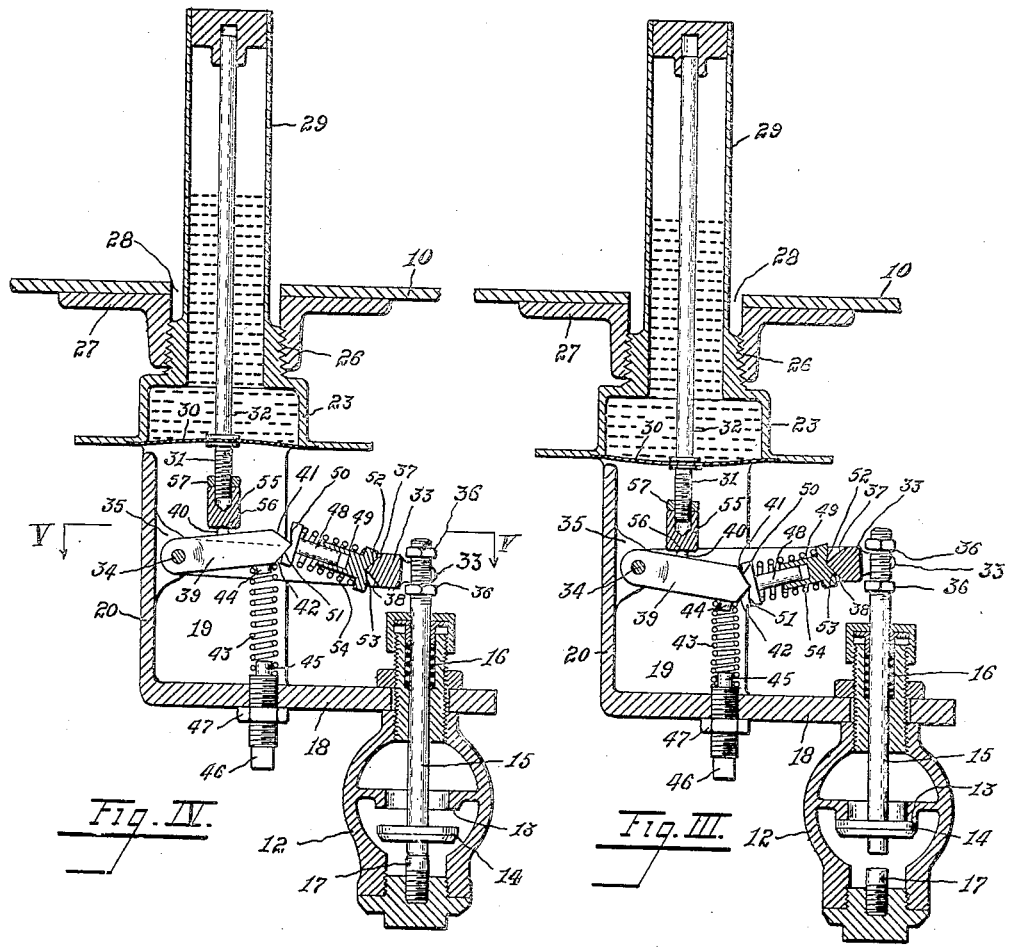
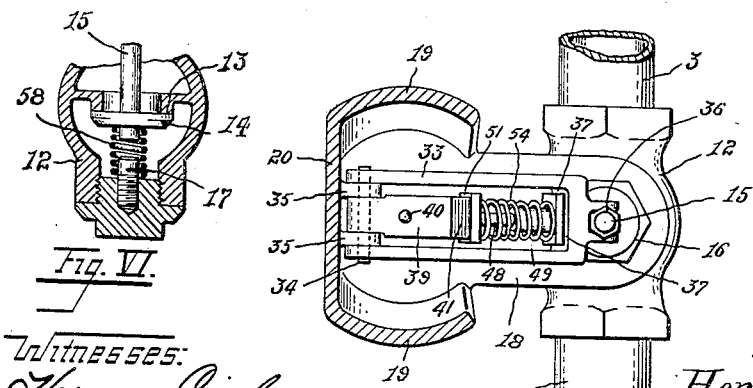
Inventor:
Herbert J. Long

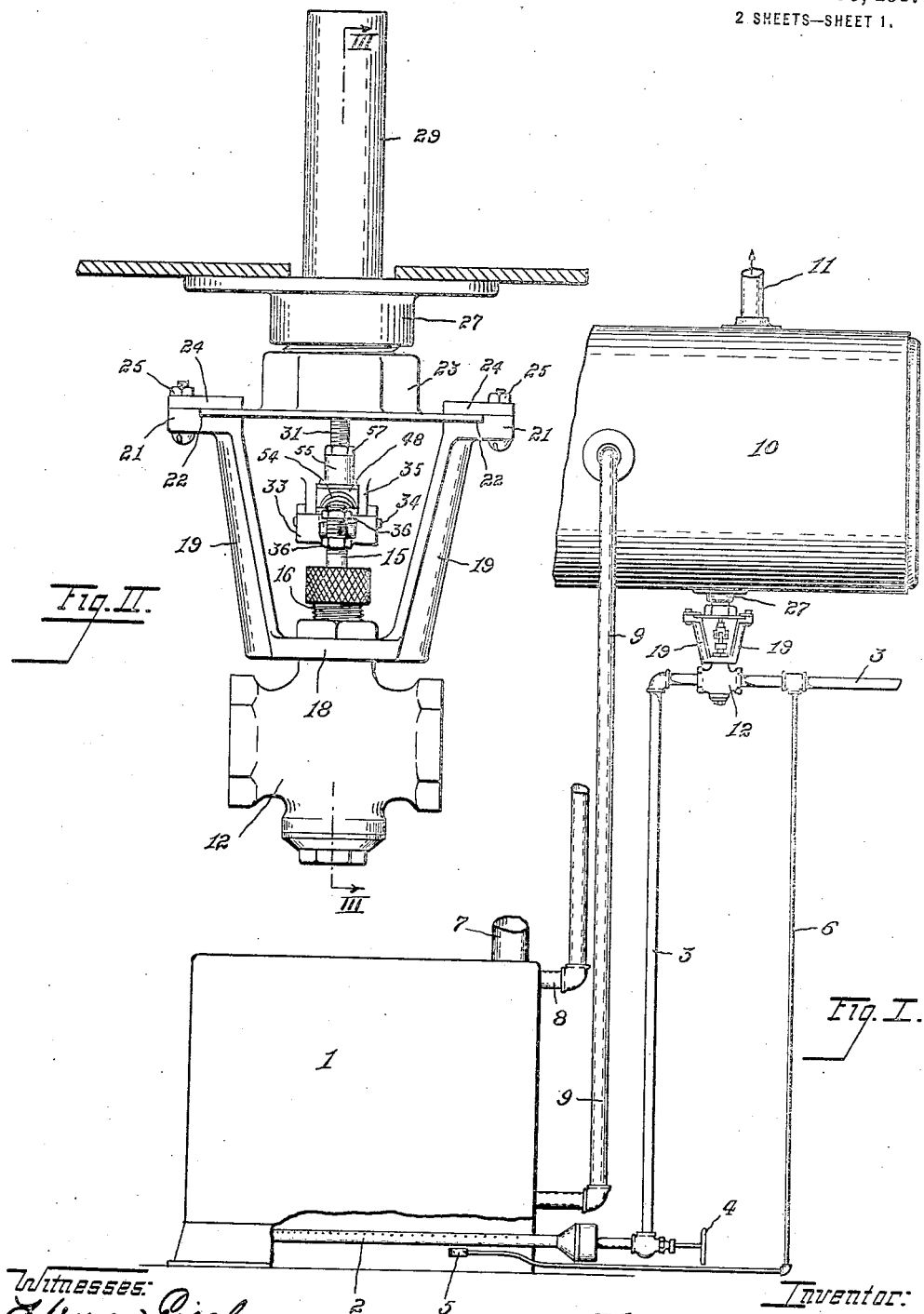

UNITED STATES PATENT OFFICE.

HERBERT J. LONG, OF NEW BRUNSWICK, NEW JERSEY, ASSIGNOR TO THE LONG, LANDRETH SCHNEIDER CO., OF NEW BRUNSWICK, NEW JERSEY, A CORPORATION OF NEW JERSEY.

THERMOSTATIC SNAP CONTROL.

1,231,527. Specification of Letters Patent. Patented June 26, 1917.

Application filed September 14, 1914. Serial No. 861,511.

*To all whom it may concern:*

Be it known that I, HERBERT J. LONG, a citizen of the United States, residing at New Brunswick, in the county of Middlesex and State of New Jersey, have invented a new and useful Improvement in Thermostatic Snap Controls, of which the following is a specification, the principle of the invention being herein explained and the best mode in which I have contemplated applying that principle, so as to distinguish it from other inventions.

My invention relates to a thermostatic valve control operating on the "snap" principle.

I am aware that thermostats have been employed for many years to either gradually open or gradually close a valve, a certain amount of movement of the thermostat causing the valve eventually to become either entirely closed or completely open. The snap principle was also long since evolved to suddenly effect either a complete opening or closing of a valve. More recently it was discovered that by combining the snap principle with a thermostatic control, waste either by useless heat radiation or unlighted fuel leakage or other than maximum burning efficiency, as well as annoyance from "puffing" or "flashing back" in the mixing chamber of a burner not equipped with a gauze partition, might be avoided. However, such mechanisms as have been contrived for the utilization of this discovery have not been sufficiently reliable even waiving complication, since the major extent of movement of the thermostat in say, the direction of opening, while idle as regards the transfer of such movement to the valve was equally idle as a deterrent of possible independent opening of the valve.

Accordingly, the object of this invention, besides involving a structure simple and economical of manufacture, is to provide a substantially frictionless thermostatic snap valve control which while adapted to cumulate and release energy sufficient to suddenly completely open or entirely shut a valve, will positively and at times with even increasing firmness, hold the latter in either extreme position until the very moment when a complete return to the other extreme position is initiated. Only in this way can the snap operation of a valve be uniformly effective and hence reliable.

Figure I is an elevation of a water heating circuit embodying together with my invention, a heater, storage tank and suitable gas and water connections.

Fig. II is an enlarged view of my thermostatic snap-control proper.

Fig. III is a vertical section on line III—III of Fig. II showing the position of the parts when the valve is closed.

Fig. IV is a similar view with the parts in the position assumed when the valve is open.

Fig. V is a section on line V—V of Fig. IV looking in the direction indicated by the arrows.

Fig. VI illustrates a modification involving the incorporation of an additional detail.

The inventive conception is associated with means which are hereinafter explained and variously combined in the claims. While the annexed drawing and particular description thereof, set forth the preferred form embodying my invention, it should be understood that the means only exemplify some of many diversified mechanical forms with which the principle of my invention may be properly applied.

A water heating system wherein it is desired to maintain the temperature of the water at an approximately predetermined degree by means of an automatic thermostatic control is seen in Fig. I to include a heater 1 provided below with burners 2 to which fuel is conducted by pipes 3 leading to a source of supply and from which the flow may be cut off at the valve 4. A pilot 5 shown in ignitible proximity to the burner draws its fuel through the pipe 6 which connects with the pipe 3 beyond the valve 4 in the usual way. The heater carries a stack 7 in its top and has its water inlet and outlets connected with return and discharge pipes 8 and 9 respectively each of which in turn connects at different heights with a storage tank 10 provided above with an outlet 11 to be connected with the faucet.

Operatively connected between the pipes 3 and as further shown in Fig. I intermediately of the valve 4 and point of connection of the pipe 6, is a valve 12. Interiorly this valve is fashioned with a seat 13 against which a head 14 which is secured to a stem 15 is adapted to be drawn. The stem 15 projects through a suitable stuffing box 16 and is to be "snap" actuated within the limits of the seat 13 and a suitable stop 17 by the movement of a thermostat as first transmitted to the interconnecting structure constituting the essence of this invention and reserved for later description.

The upper portion of the valve 12 is inserted in an opening which is near the free end of a projecting portion 18 of a hollow casting which includes as other integral portions two transverse extensions 19 on opposite sides of the portion 18 likewise connected by a stiffening web 20. The ends of the extensions 19 are formed as partially annular flanges 21 having arcuate recesses 22 as parts of a common circle. Disposed in the recesses 22 is an annular flange of a hollow member 23. The latter is removably secured therein as illustrated in Fig. II through the agency of overlying plates 24 and bolt and nut combinations 25. The member 23 is taper threaded at 26 in an annular flange 27 secured about an opening 28 in the tank 10. Such connection is clearly depicted in Figs. III and IV. Carried by and communicating through the member 23 is a closed elongated tube 29 of somewhat reduced diameter. This tube 29 is perhaps preferably of copper and contains ether or its chemical equivalent having as one of its properties quick expansion under heat and which is prevented of escape by a flexible diaphragm 30 secured to the inner edge of the flange upon the member 23. Soldered or otherwise affixed to the center of the diaphragm 30 is an outwardly projecting screw-threaded plunger 31 and this latter is precluded from movement save in the direction of its own axis by a guiding rod 32 extending axially of the tube.

A forked valve operating arm 33 is fulcrumed upon a pin 34 extending through a pair of bearing brackets 35 formed upon the inner surface of the web 20. The opposite extremity of the arm 33 articulates in any feasible manner with the valve stem 15 or any other valve actuating member. In the drawings the arm 33 has a forked extremity positioned between two adjustable nuts 36. The inner edge of the junction of the two forks of the arm 33 is fashioned as a pair of downwardly and upwardly converging beveled surfaces 37 and 38. A comparatively short lever 39 is also fulcrumed upon the pin 34, has a lug 40 upon its top about in line with the member 31 and its free extremity is moreover similarly fashioned as a pair of downwardly and upwardly converging or tapering surfaces 41 and 42 respectively. A compression spring 43 supports the end of the lever 39 in coöperation with lugs 44 and 45 inclosed thereby and located upon the under side of such end of the lever 39 and the inner extremity of a set screw 46 passed through the portion 18. The set screw 46 is provided with a lock nut 47 whereby the tension of the spring following adjustment may be so maintained until requiring further regulation.

A pair of telescoping members 48 and 49 best shown in Figs. III and IV together connect the crotch of the arm 33 and free end of the lever 39. Each such groove comprises upper and lower converging surfaces, those of the member 48 are designated as 52 and 51 respectively while those of the member 49 are designated as 52 and 53 respectively. The surfaces 50 and 51 are adapted substantially to conform to the surfaces 41 and 42 while the surfaces 52 and 53 are adapted to substantially conform to the surfaces 37 and 38. A compression spring 54 surrounds the members 48 and 49 intermediately of their end flanges and serves to hold them in engagement respectively with the free end of the lever 39 and the crotch of the forked arm 33 whereby to establish a reacting toggle arrangement. Finally connecting the thermostatically reciprocable plunger 31 with the lever 39 is a female threaded cap 55 having its lower end surface 56 adapted for engagement with the lug 40. The extent which the projection of the cap 55 lengthens the plunger 31 may be varied upon a loosening of the lock-nut 57.

The operation of my thermostatic snap-control will be readily understood if the two extreme positions which the parts are capable of assuming as shown in Figs. III and IV are inspected. It is apparent that the lever 39 together with the two telescoping members 48 and 49 considered as an entity, are enabled to rock in engagement with each other for a limited distance to either side of the plane of alinement therebetween. The spring 43 is constantly tending to move the lever 39 in one direction whereas the thermostatically actuated plunger is periodically tending to overcome and actually capable of overcoming the action of the spring 43 to swing the lever 39 in the opposite direction. Owing to the fact that the spring 54 is ever tending to separate the members 48 and 49, it is immediately permitted partially to do so whenever the lever 39 has been carried past its dead-center position with reference to the member 48. At such a moment the outer end of the arm 33 is either suddenly lifted or forcibly depressed until the movement of the valve stem and hence of all the parts is arrested by reason of such stem having reached one prescribed limit of its travel.

In Fig. III the expansion of the ether in the tube 29 by the conduction of heat thereto has caused the expansion of the diaphragm against the action of both of the springs 43 and 54 until the lever 39 became depressed ever so slightly beyond dead-center or below dead-center, as exemplified in the drawings. The action of the spring 54 thereupon snaps the lever 39 and other parts into the position seen in Fig. III to completely close the valve 12 and cut off further supply to the burners 2. It should be emphasized here that during the initial movement of the thermostatic plunger in response to the expansion outwardly of the diaphragm center, the valve has been positively held in its open position with cumulative firmness since the spring 54 is progressively undergoing added compression. This circumstance is an especially noteworthy feature during a reversal of the operation when it is desirable to absolutely preclude the escape of gas, probably as waste, during the interval of movement of the thermostat preparatory to a rapid full opening of the valve. As the heat enveloping the other diminishes the latter contracts and hence also the diaphragm thus permitting the spring 43 to recover and further compress the spring 54. Therefore, until the very instant of travel above dead-center, when positive full opening of the valve is to occur the valve is not only held positively closed but part of the time with a cumulative degree of firmness.

The modification which Fig. VI illustrates involves auxiliary means in the form of a compression spring 58 inclosing the inner ends of the stem 15 and stop 17 whereby the valve is positively seated even during the short interval when the snap-control is in its neutral position.

A water-heating system supplied with my invention burns gas only when necessary and at such times at the full rate of flow known to give maximum efficiency, while at no time is gas allowed to escape unburned.

I claim:—

1. In a thermostatic snap-control the combination of a valve actuating part, a thermostatically actuated element, a pair of pivoted members, one of said members intersecting the path of movement of said element, a spring holding it against the latter, the other of said members articulating with said valve actuating part, and resistance means forming together with said path intersecting member a reacting toggle arrangement operatively connected with the member which articulates with said valve actuating part, the arrangement being such that gradual movement of said element in reversed directions presently snaps said valve actuating part in opposite directions.

2. In a thermostatic snap-control the combination of a valve stem, a thermostatic motor, and actuating mechanism operatively connecting said motor and valve stem and including an arm articulating with the latter, said mechanism also including a reacting toggle arrangement constantly connecting the fulcrum and free end of said arm and adapted to store power during the first portion of the movement of the motor in a direction to shift the valve and to give off the power thus stored after the actuating mechanism has been moved through a predetermined range of movement by said motor, whereby to effect a quick reversal of position of said valve.

3. In a thermostatic snap-control, the combination of a valve actuating member, a thermostatically actuated plunger, and mechanism adapted to operatively connect said member and plunger and including an arm extending therebetween and articulating with the former, said mechanism also including a spring controlled toggle arrangement, whereby an actuation of said plunger in the direction of opening of the valve successively exercises a force upon the valve actuating member tending to first close and then to open such valve.

4. In a thermostatic snap-control, the combination of a water conduit, a pilot, burners, a fuel valve communicating with the latter, a thermostat operatively associated with said conduit, and a spring controlled mechanism including an arm and a lever having fixed fulcrums and directly connected with said valve and thermostat respectively and yieldingly with each other, a part of such mechanism constituting a reacting toggle arrangement, said toggle arrangement being adapted to suddenly either wholly open or wholly close said valve, the arrangement being furthermore such that said valve is positively held in one of its extreme positions until the moment of reversal to the other.

5. In a thermostatic snap-control, the combination of a water conduit, a pilot, burners, a valve communicating with the latter, a thermostat operatively associated with said conduit, an arm and a lever operatively connected with such valve and thermostat respectively and movable into a particular plane, and means yieldingly connecting said arm and lever and forming in conjunction with the latter a reacting toggle arrangement, said means being movable into the same plane, whereby the begin and end of effective movement of said thermostat in either direction exercises a reversed force upon the valve.

6. In a thermostatic snap-control, the combination of a water conduit, a pilot, burners, a fuel valve communicating with the latter and including a valve stem, a thermostat operatively associated with said conduit and having an actuating plunger, a pivoted lever extending across the path of movement of said plunger, an arm fulcrumed near said lever pivot and connected to said valve stem, said lever and arm adapted to swing relatively to each other, means including a spring yieldingly connecting the free ends of said arm and lever to form a reacting toggle arrangement, and a return spring arranged to resist the action of said thermostat upon said lever.

7. In a thermostatic snap-control the combination of a valve stem, a thermostatically actuated member, and mechanism operatively connecting said member and valve and including; an arm having a fixed pivot and a free end articulating directly with said stem, together with a reacting toggle arrangement adapted to play between such fixed pivot and free end of said arm whereby alternately to shift the position of the latter in response to the action of said member.

Signed by me, this 1st day of September, 1914.

HERBERT J. LONG.

Attested by—
J. CLARK LOUDEN,
W. G. SELAVER.